UNITED STATES PATENT OFFICE.

THOMAS SMITH, OF ALLIANCE, OHIO.

PLASTIC REFRACTORY MATERIAL FOR REPAIRING INGOT-MOLDS.

SPECIFICATION forming part of Letters Patent No. 284,502, dated September 4, 1883.

Application filed July 25, 1883. (No specimens.)

*To all whom it may concern:*

Be it known that I, THOMAS SMITH, a subject of Great Britain, intending to become a citizen of the United States, residing at Alliance, in the county of Stark and State of Ohio, have invented certain new and useful Improvements in Plastic Refractory Materials for Repairing Ingot-Molds, of which the following is a specification.

In order to set forth my invention more distinctly, I will first briefly describe the steps which are ordinarily followed in the process of casting steel ingots in molds. The molds generally used, when new, weigh from one to four thousand pounds, and are very expensive, being usually made of cast-iron. Into these the steel is poured after being melted, and the operations of melting and pouring into the molds are kept up substantially continuously. Even under ordinary circumstances there is more or less wear and gradual impairing of the molds by the cutting out of the inside. In order to use a mold repeatedly and rapidly, the ingots are successively chilled by the application of a stream of water after a "set" of molds has been taken from the "pit," so that they (the ingots) will drop more readily from the molds, and then, when nearly cold, they are again placed in the pit to receive new charges. This repeated heating and cooling of the molds causes splits and cracks to be produced in them, and after these appear they are discarded. Again, when molten steel is being poured into new iron molds it often happens that they are cut or have holes burned in the sides, and therefore when the ingots therein cool they will not drop freely out; but the molds must be hammered on the outsides with sledges to loosen the ingots. After molds get into such condition they are condemned, and are sent to the scrap-heap.

The object of my invention is to repair the molds, after they have been impaired in any of the above ways, by the application thereto of a material which shall render them as good as they originally were. I carry out my invention by applying a material, while in a moist condition, to the inside, which shall be capable of afterward becoming very hard.

I will describe that composition of materials which I prefer to use, though it can be varied more or less without departing from the spirit of the invention.

I dissolve one pound of alum and one-quarter of a pound of sal-ammoniac in about three pints of hot water, and then mix therewith ground ganister and tuyere in the proportions of about one pound each until the compound reaches the consistency of mortar or paste. This is applied to the cracks or holes in the molds, and a sufficient amount is used to bring the surface thereof to the position occupied by the surface of the original metal. This may be allowed to harden there by exposure to the normal air; but if the mold is somewhat heated, the paste will be dried in a few moments.

By "tuyere," above, I mean a pulverized material, which I obtain by grinding and pulverizing old furnace-tuyeres to a fine powder, these tuyeres soon becoming burned out when in use with furnaces. By "ganister" I refer to the compound used in Bessemer-steel works, it being pulverized silicious stone—such as quartz, sand, &c.—and fire-clay.

I do not wish to be limited, however, to these materials, or to the proportions which I have indicated above as being those which I have found desirable, as it is well known that exceedingly hard and refractory substances can be produced of various forms by a varying of proportions and the materials of the above-described characters. Thus fire-clay may be substituted in the above composition for the ground tuyere, and instead of previously making ganister, the ingredients thereof may be separately introduced as parts of the mortar which I produce.

When the composition is made as above described, and is allowed to set, it becomes exceedingly hard—in some cases harder than the cast-iron itself of the mold—and, if properly applied, that portion of the mold formed thereby will be as durable as the iron part.

What I claim is—

1. The herein-described method of repairing molds for steel ingots or articles, it consisting in filling the cracks, holes, or irregularities with materials which, when hardened, are refractory, substantially as set forth.

2. The herein-described composition of matter, it consisting of ground tuyere, ground ganister, sal-ammoniac, alum, and water, in substantially the proportions named, for producing a refractory material to be used in the repairing of steel-molds, substantially as set forth.

In testimony whereof I affix my signature in presence of two witnesses.

THOMAS SMITH.

Witnesses:
  MILO W. STRONG,
  JAMES C. STANLEY.